C. O. CROSBY.
Assignor, by mesne assignments, to THE STRAW SEWING MACHINE COMPANY.
Sewing-Machine.
No. 7,986. *fig. 1* Reissued Dec. 11, 1877.
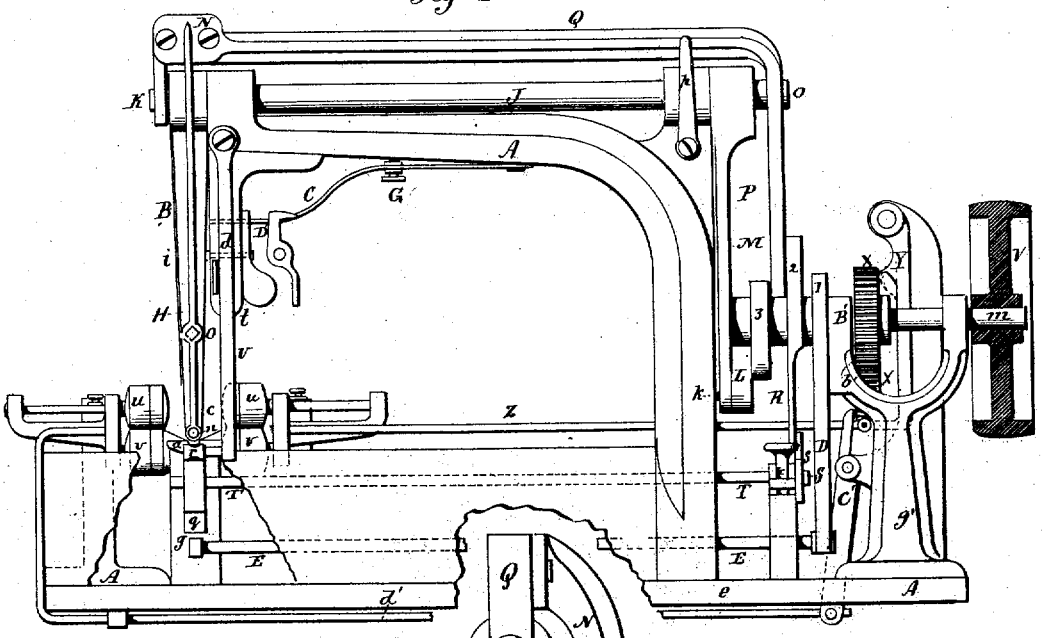
*fig. 2*
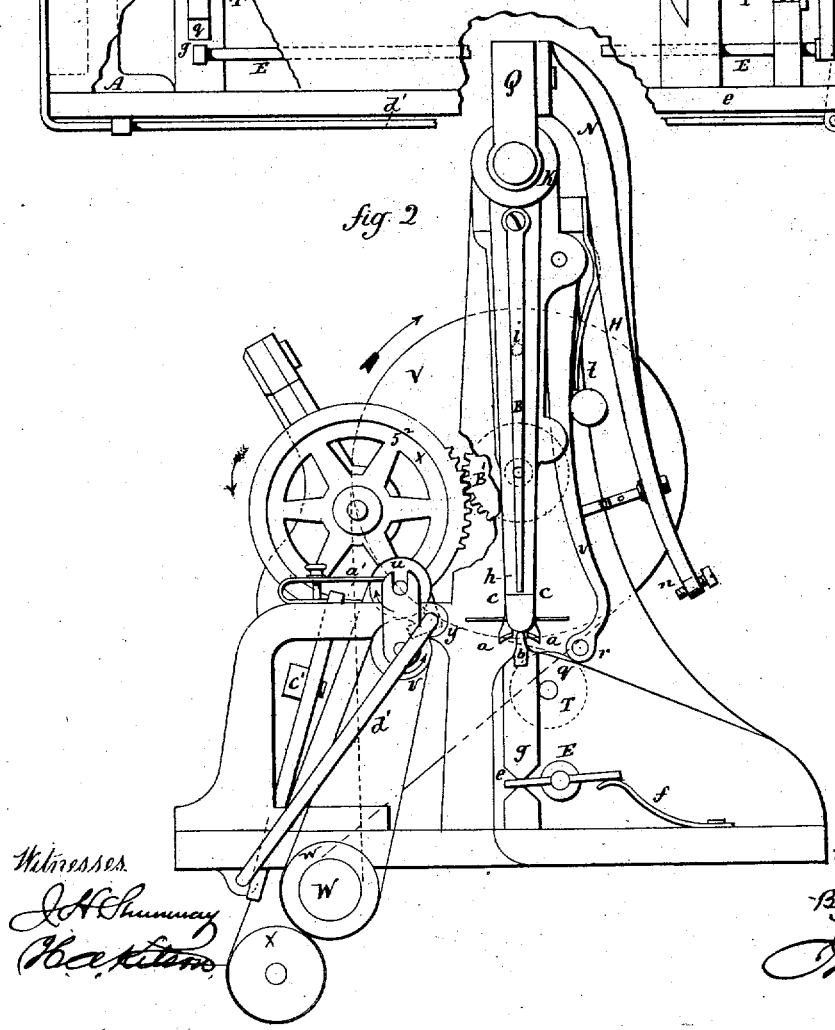
Witnesses.
J. H. Shumway
R. A. Kane
Chauncey O. Crosby
Inventor.
By Atty.
Thos. E. Earle
N. PETERS, PHOTO-LITHOGRAPHER, WASHINGTON, D. C.

C. O. CROSBY.

Assignor, by mesne assignments, to THE STRAW SEWING-MACHINE COMPANY.

Sewing-Machine.

No. 7,986. Reissued Dec. 11, 1877.

Witnesses.
J. A. Chumway
Hattemer

Chauncey O. Crosby
Inventor.
By Atty.
John E. Earle

N. PETERS, PHOTO-LITHOGRAPHER, WASHINGTON, D. C.

UNITED STATES PATENT OFFICE.

CHAUNCEY O. CROSBY, OF NEW HAVEN, ASSIGNOR, BY MESNE ASSIGNMENTS, TO THE STRAW SEWING MACHINE COMPANY, OF MILFORD, CONN.

IMPROVEMENT IN SEWING-MACHINES.

Specification forming part of Letters Patent No. 21,745, dated October 12, 1858; Reissue No. 4,305, dated March 21, 1871; extended seven years from October 12, 1872; Reissue No. 7,986, dated December 11, 1877; application filed December 4, 1877.

*To all whom it may concern:*

Be it known that I, CHAUNCEY O. CROSBY, of the city and county of New Haven, in the State of Connecticut, have invented a new and useful Improvement in Sewing-Machines; and I do hereby declare that the following is a full, clear, and exact description of the construction and operation of the same, reference being had to the accompanying drawings, which make a part of this specification.

My improvements consist of certain combinations of mechanical devices, which are recited in the claims at the close of this specification, and its object is to enable the material to be sewed in a bent condition.

In order that my improvement may be fully understood, I have represented in the accompanying drawings, and will proceed to describe, a machine containing all my combinations in the best form in which I had embodied them before making application for my original patent.

Figure 7:
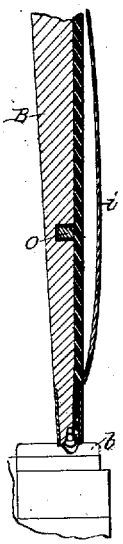
Figure 3:
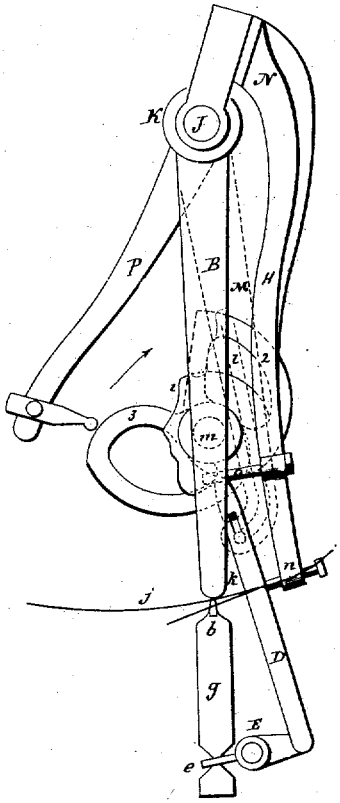
Figure 6:
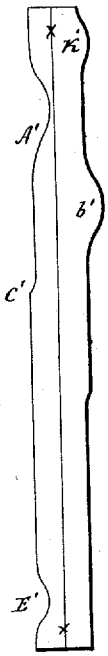
Figure 8:
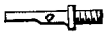
Figure 9:
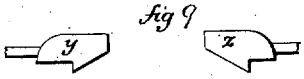
Figure 4:
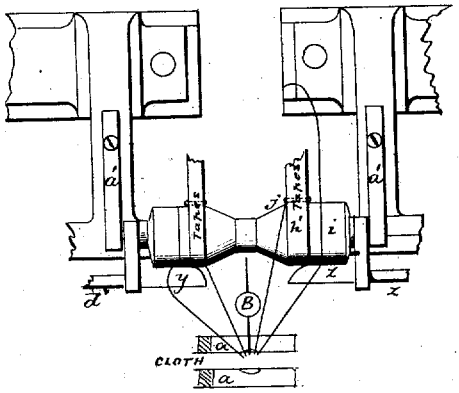
Figure 5:
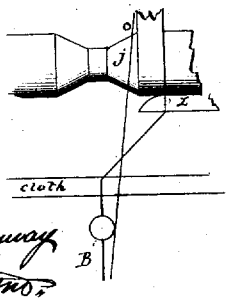

Figure 1 represents the whole machine as viewed from the right-hand side. Fig. 2 represents the same view from the front end, showing the needle-bar, thimble-bar, the tape-pulleys with the endless tapes, the gear-wheels, &c. Fig. 3 represents the same viewed from the front end, showing the cams, levers, &c. Fig. 4 is a plan of a portion of the same, showing the relative positions of the tape-pulleys, needle-bar with needle, position of the cloth, &c., during the backward movement of the needle-bar. Fig. 5 is a plan of a portion of Fig. 4, showing the positions in the forward movement of the needle-bar. Fig. 6 is a diagram of the cam-wheel, developed in a horizontal plane, showing the cams on each side. Fig. 7 represents the needle-bar and parts connected therewith. Fig. 8 is a plan of the bar which passes through the needle-bar to release the needle, as *o*, Fig. 3. Fig. 9 is a plan of the hooks which carry the loop of the slack thread to the endless tapes.

I make the frame A of cast-iron or any other suitable material, substantially in the form shown in Fig. 1, or any other convenient form. I make the cloth-holder, in part, of a pair of spring-jaws or clamps, *a a*, as represented in longitudinal plan in Fig. 1, in cross-section in Fig. 2, and in plan in Fig. 4, which corresponds with the thumb and middle finger of the left hand. The jaws are sustained by a split bar, the parts of which serve as springs, as indicated at *c*, Fig. 1, and at *c c*, Fig. 2.

I suspend this split bar, and of course the jaws, by a pin in a slot in the bar, as at *d*, Fig. 1, and I press it down by a spring, C, Fig. 1, so that the jaws will conform to any thickness of cloth, and they may be held down by a hook, as shown at D′, or the spring may be adjusted by a thumb-screw, as at G, Fig. 1; but neither of these are very material. I have a tongue or piece, as shown at *b*, Fig. 3, which constitutes the other part of the cloth-holder, and which passes up between the jaws *a a*, as seen in Fig. 2, to force up the bight or bend of the cloth, as indicated in Fig. 4, to allow the needle to pass through it. This tongue corresponds with the forefinger of the left hand in sewing.

This tongue is fitted into the upper end of the movable frame *g*, Figs. 1, 2, and 3, to render it susceptible of being changed to suit the thickness of the cloth, as thicker cloth will require a thicker tongue to prevent bending it too short. And this frame *g* is elevated by the operation of the cam No. 1, Figs. 1 and 3, through the medium of the bar D, Figs. 1 and 3, rock-shaft E, Figs. 1, 2, and 3, and lever *e*, Figs. 2 and 3, and it is depressed by the spring *f*, Fig. 2, acting on the lever *e*.

Across the center of these jaws *a a* and tongue *b* I cut a V-shaped notch, as indicated in Fig. 4, to allow the needle to pass through the cloth without touching the jaws or tongue, and prevent injuring the point of the needle or chafing the thread.

I make the needle-bar B, Figs. 1, 2, 3, 4, and 5, of iron or any other suitable material, substantially in the form indicated in Fig. 3, and in the lower end I cut a notch or slot of a suitable shape to receive the needle at right angles to the bar. And in the front side of this needle-bar, from the lower end upward, I cut a longitudinal slot or space, as indicated, Fig. 7, of sufficient length to receive a lever, which is also shown in the same figure. This lever is sustained at the upper end by a joint-pin, and the lower end extends to the lower end of the needle-bar. Near the lower end of this lever I cut a notch on an inclined plane, so that the lower points of this plane will pass under the needle (by the pressure of a spring, *i*, Figs. 1 and 2) and force it upward in the notch in the end of the needle-bar, and hold it there until it is released by the operation of the machine.

The upper end of this needle-bar B is firmly attached to the front end of the shaft J by a screw, K, Figs. 1, 2, and 3, and the lower end receives a vibratory motion of several inches parallel to the front end of the machine, as indicated by the curved line *j*, Fig. 3. This motion is produced by a crank, L, Fig. 1, on the cam-shaft *m*. The pin *k* of this crank works in a slot on the lever M, Fig. 1, which slot is indicated by dots at *l*, Fig. 3. The upper end of this lever is firmly attached to the rear end of the shaft J, and its vibratory motion controls the vibratory motion of the needle-bar. When the pin *k* acts in the lower portion of the slot *l* it has the greatest leverage, and the lever M has the least velocity, so that the needle-bar will be carried in its forward movement with greater force and less velocity than when the crank-pin *k* works in the upper portion of the slot, to bring the needle-bar back for another stitch; and while the pin is passing into the curve at the lower end the needle-bar is nearly stationary, it being the time when the needle is released from the notch.

I make the thimble-bar H of iron or any other suitable material, substantially in the form shown in Figs. 2 and 3. At the lower end I insert an adjusting-screw, with a countersink in the end, to receive the eye of the needle, as shown at *n*, Figs. 2 and 3. A little above the screw I insert a bar or blade, as seen at *o*, in Figs. 2 and 3. On the front side of this bar I have an inclined plane, as indicated in Fig. 2, and more fully shown in Fig. 8. When this bar *o* passes through the mortise in the needle-bar B, as shown in Figs. 3 and 7, the inclined plane forces back the notched lever, and releases the lever after the needle-point has entered the cloth. This thimble-bar is attached, near the front end of the vibrating bar Q, above the shaft J, as shown at N, Figs. 1, 2, and 3. This vibrating bar Q extends the whole length of the shaft J, and vibrates with bearings on the ends of that shaft J, as seen at K and O, Fig. 1. This thimble-bar receives a vibrating motion, to force the needle through the cloth, and to release the needle from the needle-bar, by the operation of the cam No. 3 on the lever P, Figs. 1 and 3, which has its bearing at O, and controls the forward motion of the thimble-bar, and the thimble-bar is thrown back to the position shown in Fig. 2 by the spring *p*, which keeps the lever P in contact with the cam.

To feed the cloth I use the fluted roller *q* and a plain pressure-roller *r*, as indicated in Figs. 1 and 2, in the well-known way of feeding used in spinning-machines and in feeding cloth, &c., for various purposes. I work this fluted feed-roller *q* by means of the cam No. 2 acting on the lever R with a click or hand, *s*, working in the ratchet-wheel S, all as shown in Fig. 1. This ratchet-wheel S is firmly secured on the rear of the shaft T, Fig. 1, on the front end of which the fluted roller *q* is secured, as shown in Figs. 1 and 2; and the pressure-roller *r* is sustained by a bar, U, and the pressure given by a spring, *t*, Figs. 1 and 2. This feed may be adjusted, by the screw near *s*, to any desired length of stitch.

To draw the main part of the thread through the cloth, and to control the slack thread, I use four endless tapes, working on pulleys, all as indicated at *u*, *v*, *w*, and *x* in Fig. 2, and also indicated in part in Figs. 1, 4, and 5. These pulleys are revolved in the directions indicated by the darts in Fig. 2 by a cross-band from the driving-pulley V, Fig. 2, and they carry the endless tapes in the direction indicated by the darts in Fig. 2, and the upper pulleys *u* are held down by springs *a'*, Figs. 2 and 4. In connection with these endless tapes, I have two hooks, *y* and *z*, as shown in Fig. 4, their shape being shown in plan in Fig. 9. The hook *y* is carried across the thread, so as to hook onto it by the operation of the cam *b'*, Figs. 6 and 1, on the gear-wheel X, Figs. 1 and 2, acting on the lever *c'*, Figs. 1 and 2, through the medium of the bent rod *d'*, as shown in Fig. 1, and indicated in Figs. 2 and 4, and is thrown back by a spring acting against the lower end of the lever *c'*, Fig. 1. The hook *z* is forced forward across the thread, so as to hook onto it by a spring acting against the lower end of the lever Y, Fig. 1, which is connected with the rear end of the rod Z, Figs. 1 and 4, and it is carried back and held back by the operation of the cam A', Fig. 6, on the gear-wheel X, Figs. 1 and 2. This gear-wheel X is revolved in the direction indicated by the dart in Fig. 2 by means of a small wheel, B', Figs. 1 and 2, which is firmly secured on the cam-shaft *m*, and revolves with the driving-pulley V. This small wheel has but half as many teeth as the wheel X, so that the cam-wheel X makes but one revolution while the driving-pulley V makes two.

Having constructed the several parts of the machine, and arranged them as before described, I pass the cloth in a suitable manner into the cloth-holder, above the tongue *b* and below the jaws *a a*. I pass the thread through the eye of a common sewing-needle, of suitable size for the thread, and secure it there. I then bring the needle-bar B to the right-hand side of the cloth-holder to its full extent, place the eye of the needle in the countersunk end of the adjusting-screw *n* in the lower end of the thimble-bar, and put the barrel or shaft of the needle into the notch in the lower end of the needle-bar, so that it will be sustained by the inclined notch of the lever, when the machine is ready for operation, having the tapes, &c., in their places. I then put the driving-pulley V in motion in the direction indicated by the dart, (by means of a treadle or otherwise,) when the cam No. 1, acting on the lever D, will carry up the tongue *b* and force the cloth upward between the jaws *a a;* and the crank L, acting in the lower portion of the slot in the lever M, will carry the needle-bar forward; and the cam No. 3, acting on the lever P, will also carry the thimble-bar forward and force the point of the needle through the cloth, while the needle is guided by the needle-bar. While the crank L is operating in the curve of the groove, near the lower end of the lever M, the thimble-bar will advance much faster than the needle-bar, and pass the bar *o* through the mortise in the needle-bar, as seen in Fig. 3, so that the inclined plane of *o*, Figs. 2 and 8, will force back the notched lever, and release the needle from the needle-bar, which will then pass over the jaws, immediately after which the tongue *b* will be elevated, so as to raise that portion of the needle which has been forced through the cloth by the forward movement of the thimble-bar into the notch in the lower end of the needle-bar, whereupon the cam No. 3 will release the lever P, and the thimble-bar will be thrown back by the spring *p*, and the inclined notch in the lower end of the lever in the needle-bar will firmly grasp the needle, and the needle-bar (in its continued forward movement) will carry the needle with the thread beyond the tape-pulleys *u* and *v*. At this time the projection on the lever *y* will fall into the space near A′, Fig. 6, on the rear side of the cam-wheel X; and the spring will force the hook Z across, and hook it onto the thread, when the cam A′, Fig. 6, acting on the lever Y, Fig. 1, will draw back the hook Z to the position shown in Fig. 4, and thus carry the loop of the thread to the central portion of the endless tapes, as at *h′*, Fig. 4. Then the endless tapes will carry the thread onward until the whole is drawn through the cloth, when the rise of the cam at C′, Fig. 6, will draw the hook Z still farther back, and carry the thread beyond the edge of the endless tapes, as shown at *i′*, Fig. 4, while the other side of the loop (that attached to the needle) will be in the position shown at *j′*, Figs. 4 and 5. A pin may be used, as shown near *j′*, to keep this portion of the loop more certainly out of the way of the needle while the thread is very long; but this pin is not very material. The needle-bar is then returned to its first position, the tongue *b* having descended to allow the needle-bar with the needle, as shown in Figs. 2 and 4, to pass over the cloth in its backward movement. At this time the cloth is fed by the fluted and pressure rollers, as before described, and all is ready for another stitch, as indicated in Fig. 5.

The next stitch is performed in precisely the same manner as the last, except that the hook *y* takes and carries the thread to the other pair of endless tapes, and the last loop is completely drawn up, while the succeeding one is being carried away by the endless tapes. When the loop has been drawn up to about the position shown at Fig. 4, the hook, by means of the cam K′, or the depression E′, will be carried toward the needle, so as to release the loop to allow it to be completely drawn up. Thus stitch after stitch will be taken.

I am aware that a rough surface (fluted roller or otherwise) has been used for feeding for ages in spinning-machines, and for feeding cloth and various other materials; that the common sewing-needle (with the eye at one end and the point at the other) is not new; and that cams, levers, &c., are old. I therefore do not claim either of these, as such, as my invention.

I am also aware that cloth has been bent by means of revolving fluted rollers, which both bent the cloth and fed it along, whereas my bending mechanism or cloth-holder bends the cloth without feeding it, the feeding being effected by means of an independent feeding apparatus. I therefore do not claim such bending and feeding-rollers as parts of my invention or combinations; but What I do claim as my invention and desire to secure by Letters Patent, is—

1. The combination, substantially as before set forth, of the cloth-holder, composed of two jaws and a tongue-piece, fitted to force the cloth between said jaws, with means for carrying and impelling the needle, whereby the cloth is bent anew over the tongue at each stitch, and the needle is forced into such bent portion of the cloth.

2. The combination, substantially as before set forth, of the needle-bar and thimble-bar with a common needle, the said parts being arranged to operate substantially as herein described.

3. The combination, substantially as before set forth, of the feeding apparatus with the needle-bar, for carrying the needle, and with the cloth-holder, consisting of two jaws, and a tongue-piece fitted to force the cloth between said jaws.

4. The combination, substantially as before set forth, of the feeding apparatus with the bar for carrying the needle, and with the cloth-holder, consisting of two jaws and a tongue-piece fitted to force the cloth between said jaws, and provided with a notch to allow the needle to pass.

CHAUNCEY O. CROSBY.

Witnesses:
JOHN E. EARL,
H. A. KITSOR.